United States Patent
Chu

(10) Patent No.: US 9,254,886 B2
(45) Date of Patent: Feb. 9, 2016

(54) FOLDABLE BICYCLE HANDLEBAR

(71) Applicant: Shao-Hua Chu, Taipei (TW)

(72) Inventor: Shao-Hua Chu, Taipei (TW)

(*) Notice: Subject to any disclaimer, the term of this patent is extended or adjusted under 35 U.S.C. 154(b) by 0 days.

(21) Appl. No.: 14/449,152

(22) Filed: Aug. 1, 2014

(65) Prior Publication Data

US 2015/0033904 A1    Feb. 5, 2015

(30) Foreign Application Priority Data

Aug. 1, 2013  (TW) .............................. 102127591 A

(51) Int. Cl.
*B62K 21/16*    (2006.01)

(52) U.S. Cl.
CPC ........... *B62K 21/16* (2013.01); *Y10T 74/20798* (2015.01)

(58) Field of Classification Search
CPC ......... B62K 21/12; B62K 21/26; B62K 21/16
USPC .................................. 74/551.3–551.5, 551.1
See application file for complete search history.

(56) References Cited

U.S. PATENT DOCUMENTS

| 561,329 A | * | 6/1896 | Leonard ...................... 74/551.6 |
| 575,266 A | * | 1/1897 | McCollum et al. .......... 74/551.5 |
| 5,367,774 A | * | 11/1994 | Labarre et al. .................. 30/262 |
| 6,637,288 B2 | | 10/2003 | Chu |

FOREIGN PATENT DOCUMENTS

| TW | M427336 | 4/2012 |
| TW | M434717 | 8/2012 |

* cited by examiner

*Primary Examiner* — Thomas Diaz
(74) *Attorney, Agent, or Firm* — Jianq Chyun IP Office

(57) ABSTRACT

A foldable bicycle handlebar includes a fixing base having two holes on a hinge surface, two handlebar grips each having a joint with a hinge hole, an upper fastener fixed to the joints, two shafts passing through holes of the upper fastener, and a slider fixed to the hinge surface. At least one tenon is on a recess that is on a side of each handlebar grip. The hinge holes, and the two holes of the fixing base, and a gap is between the two joints. The slider has an inner surface, a protrusion is extended outwardly from the inner surface to the gap, and a mortise is formed on the inner surface, so that the tenon is inserted into or removed from the mortise. Whether the handlebar grips are unfolded for use or folded for storage, safety and reliability of the foldable bicycle handlebar are ensured.

4 Claims, 9 Drawing Sheets

FOLDABLE BICYCLE HANDLEBAR

CROSS-REFERENCE TO RELATED APPLICATION

This application claims the priority benefit of Taiwan application serial no. 102127591, filed on Aug. 1, 2013. The entirety of the above-mentioned patent application is hereby incorporated by reference herein and made a part of this specification.

BACKGROUND

1. Field of the Invention

The invention relates to a foldable bicycle handlebar; more particularly, the invention relates to a quickly and conveniently foldable bicycle handlebar that can be secured and is not unintentionally loosened no matter whether the foldable bicycle handlebar is unfolded or folded, so as to satisfy the safety requirements.

2. Description of Related Art

A conventional foldable bicycle handlebar, as disclosed in U.S. Pat. No. 6,637,288 invented by the inventor of the invention described herein, is a handlebar that can be folded in half along a central folding line. The conventional handlebar is fixed by applying a pressing force, which is rather unreliable. If the pressing force is not sufficient, the handlebar may be loosened or released during the ride.

In addition, Taiwan utility model patent no. M434717 and Taiwan utility model patent no. M427336 respectively disclose a foldable positioning structure of a foldable bicycle handlebar. Here, a folding mechanism is configured on a stem of the handlebar, and transverse space can be effectively saved. However, the folding mechanism in a folding state cannot be fixed and may swing, and the large moment easily causes damages to the folding mechanism. After a long ride, the handlebar may be loosened to a greater extent, which may significantly compromise the comfort and the safety of a rider during the ride.

SUMMARY OF THE INVENTION

The invention is directed to a foldable bicycle handlebar with a secure positioning device, such that two handlebar grips of the foldable bicycle handlebar can be fastened and are not unintentionally released no matter whether the two handlebar grips are in an unfolded state or a folded state; thereby, safety of a rider of the bicycle can be ensured.

The invention is further directed to a foldable bicycle handlebar having two handlebar grips which can be easily, quickly, and properly folded or unfolded.

The aforementioned and other structural features and effects of the invention will be fully apparent from a reading of the following description with reference to the accompanying drawings. In an embodiment of the invention, the foldable bicycle handlebar includes a fixing base, left and right handlebar grips, an upper fastener, two shafts, and a slider. The fixing base has two holes on a hinge surface in the front of the fixing base. Each of the two handlebar grips has a joint on its inner side, and the joints are rotatable if a force is exerted to the joints. A body of each of the joints has a longitudinal hinge hole, and a recess is formed on a side surface of each of the two handlebar grips. At least one tenon is formed on the recess. The upper fastener is fixed to the two joints, and holes are formed on a body of the upper fastener. The two shafts pass through the holes of the upper fastener, the hinge holes, and the two holes of the fixing base. The two handlebar grips can be folded and unfolded at a limited angle with respect to the two shafts as rotational axes, and a gap is formed between the two joints. The slider has an inner surface, and a protrusion is extended outwardly from the inner surface. A mortise is arranged on the inner surface, and the at least one tenon can be timely inserted into or removed from the mortise. The protrusion is extended into the gap, and the slider can be loosely or securely fixed to the two joints.

Several exemplary embodiments accompanied with figures are described in detail below to further describe the invention in details.

DETAILED DESCRIPTION OF DISCLOSED EMBODIMENTS

Figure 1:
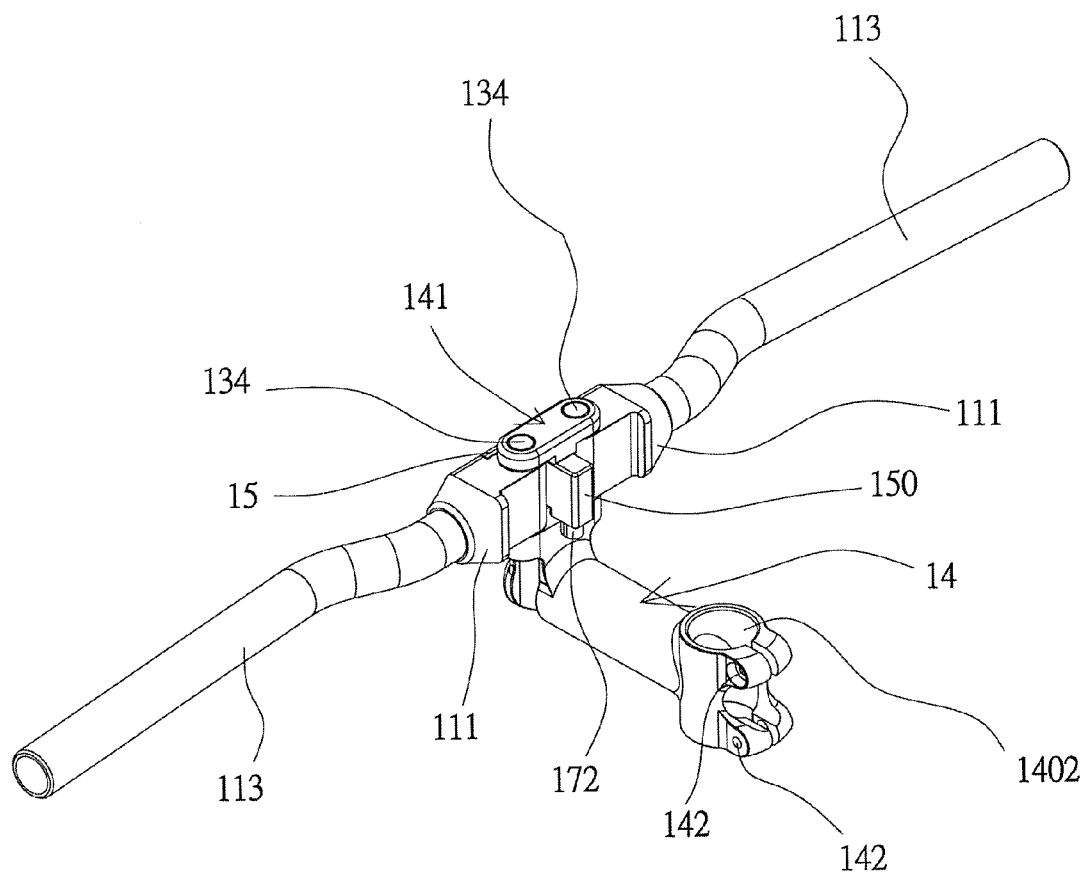
FIG. 1 is a three-dimensional diagram illustrating an assembly structure of a foldable bicycle handlebar according to an embodiment of the invention.
Figure 2:
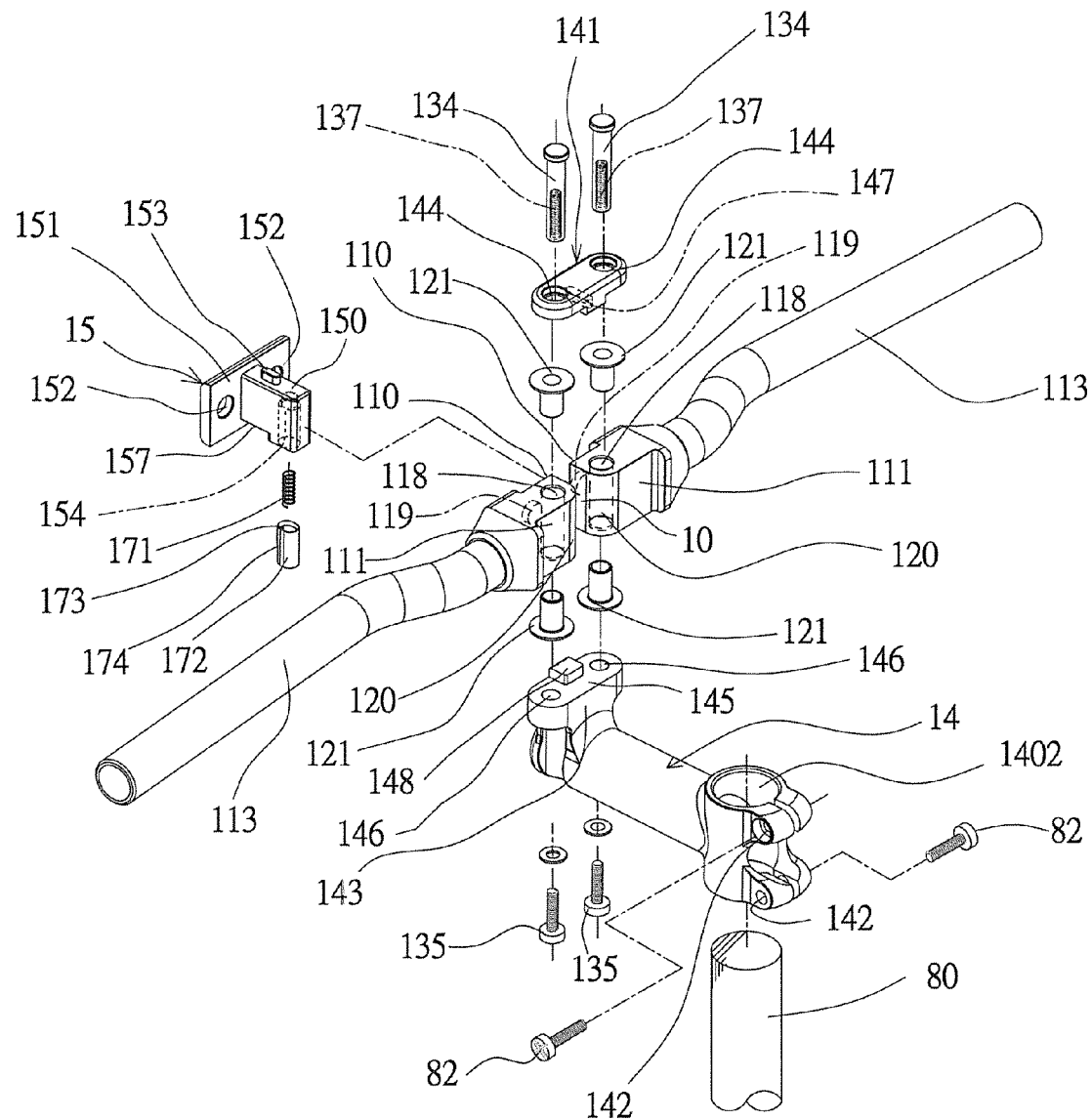
FIG. 2 is a three-dimensional explosive diagram illustrating the components depicted in FIG. 1.

According to an embodiment of the invention, the foldable bicycle handlebar provided in an embodiment of the invention and shown in FIG. 1 and FIG. 2 includes a fixing base 14, left and right handlebar grips 113, an upper fastener 141, two shafts 134, and a slider 15. The fixing base 14 has two holes 146 on a hinge surface in the front of the fixing base 14. Each of the two handlebar grips 113 has a joint 111 on its inner side, and the joints 111 are rotatable if a force is exerted to the joints 111. A body of each of the joints 111 has a longitudinal hinge hole 118, and a recess 110 is formed on a side surface of each of the two handlebar grips 113. At least one tenon 119 is formed on the recess 110. The upper fastener 141 is fixed to the two joints 111, and holes 144 are formed on a body of the upper fastener 141. The two shafts 134 pass through the holes 144 of the upper fastener 141, the hinge holes 118, and the two holes 146 of the fixing base 14. The two handlebar grips 113 can be folded and unfolded at a limited angle with respect to the two shafts 134 as rotational axes, and a gap 10 is formed between the two joints 111. The slider 15 has an inner surface 151, and a protrusion 150 is extended outwardly from the inner surface 151. A mortise 152 is arranged on the inner surface 151, and the at least one tenon 119 can be timely inserted into or removed from the mortise 152. The protrusion 150 is extended into the gap 10, and the slider 15 can be loosely or securely fixed to the two joints 111.

According to an embodiment of the invention, the protrusion 150 of the slider 15 has a room 154 for accommodating an elastic member 171 and a press button 172. An inclined surface 174 is formed on one side of the press button 172, and a connection portion 173 is located on top of the press button 172. The connection portion 173 accommodates and presses against the elastic member 171. A recessive sliding groove 157 is located close to the bottom of the room 154. A stopper 148 is located on the hinge surface in the front of the fixing base 14, and the stopper 148 is located in the sliding groove 157.

According to an embodiment of the invention, a top distal end and a bottom distal end of the hinge hole 118 of each of the joints 111 are respectively fixed to the upper fastener 141 and a bearing 121. The holes 144 are formed on the body of the upper fastener 141, a mortise slot 147 is formed on a bottom surface of the upper fastener 141, a positioning tenon 153 is located on a top surface of the protrusion 150 and is accommodated into the mortise slot 147, and the two shafts 134 respectively pass through the holes 144, the bearing 121, and the two holes 146 of the fixing base 14.

According to an embodiment of the invention, as shown in FIG. 2 and FIG. 2, the two shafts 134 have inner screw holes 137, and two screw bolts 135 are screwed into the inner screw holes 137 through the two holes 146 of the fixing base 14.

According to an embodiment of the invention, corresponding sides of the two joints 111 are arc-shaped surfaces 120.

According to an embodiment of the invention, as shown in FIG. 2, a longitudinal connection hole 1402 is formed in the back of the fixing base 14, and a steerer tube 80 of a standard bicycle can be inserted into the connection hole 1402 and fixed to a screw hole 142 on an edge of the connection hole 1402 through a screw bolt 82, such that an inner wall of the connection hole 1402 is tightly positioned on the steerer tube 80.

Figure 7:
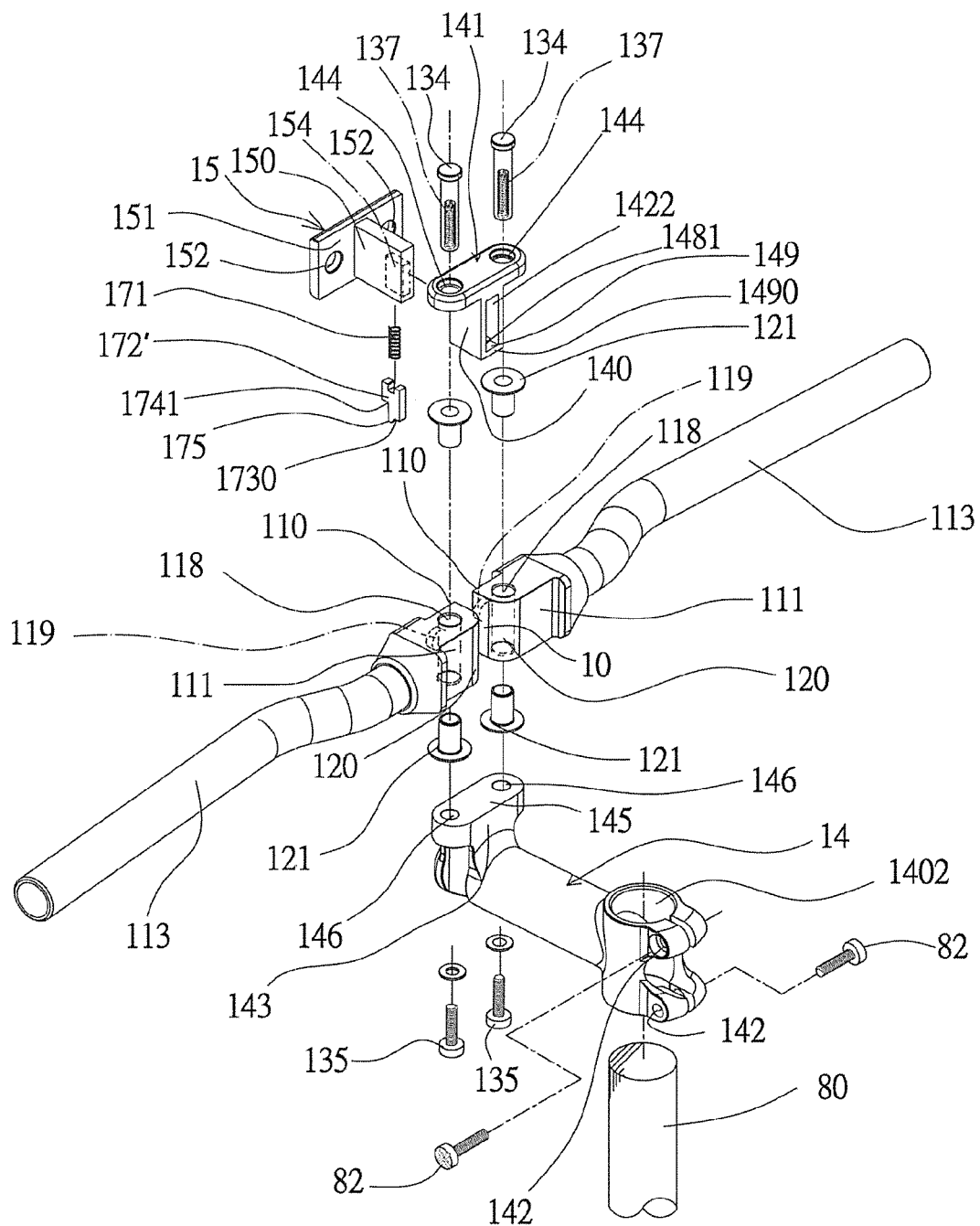
FIG. 7 is a three-dimensional explosive diagram illustrating components of a foldable bicycle handlebar according to another embodiment of the invention.

According to an embodiment of the invention, as shown in FIG. 7, the protrusion 150 of the slider 15 has a room 154 that is located at the bottom portion of the slider 150 and accommodates an elastic member 171 and a plate-shaped press button 172'. The press button 172' forms an elastic device, a recessive locking portion 1741 is formed on one side of the press button 172', a positioning tenon 175 is formed at the bottom portion of the press button 172', and a press portion 1730 that a user's finger can press is formed at the rear portion of the positioning tenon 175. A hollow bottom protrusion 140 is formed on a bottom portion of the upper fastener 141, and the hollow bottom protrusion 140 and the upper fastener 141 are integrally formed. The hollow bottom protrusion 140 has a slot 1422, and a protruding stopper 1481 is formed on a bottom surface of the slot 1422. A positioning portion 149 is in the front of the protruding stopper 1481 and is at a level lower than the protruding stopper 181. The protrusion 150 flexibly passes through the slot 1422, the bottom protrusion 140 is located in the gap 10, and a maximum width of the bottom protrusion 140 is less than a width of the gap 10.

To make the structure of the foldable bicycle handlebar and effects that can be achieved by the foldable bicycle handlebar comprehensible, embodiments accompanied with figures are provided in detail below.

Figure 3:
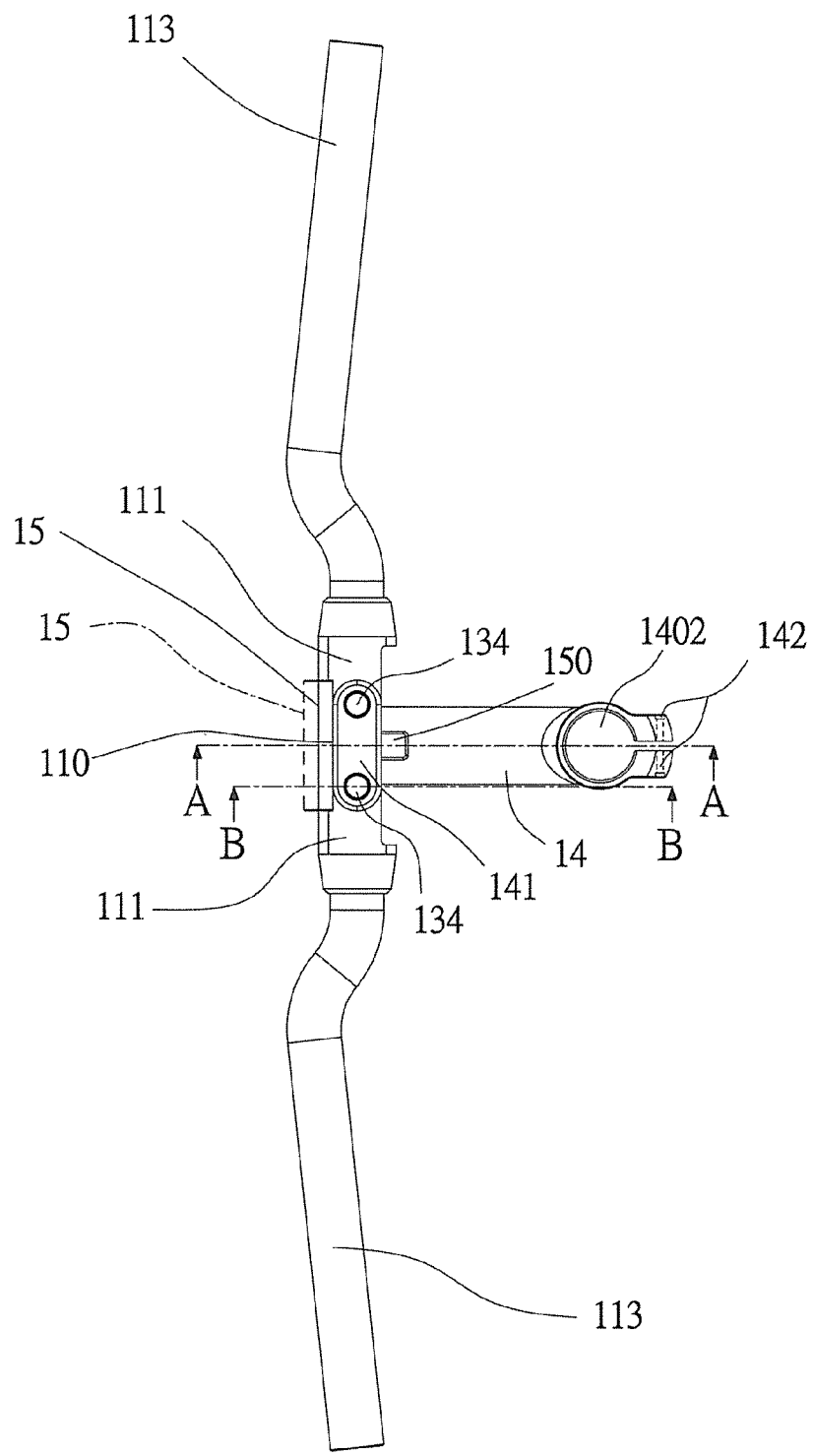
FIG. 3 is a top view of the assembly structure of the foldable bicycle handlebar depicted in FIG. 1.

With reference to FIG. 1 and FIG. 2, the longitudinal connection hole 1402 is formed in the back of the fixing base 14, and the steerer tube 80 of a standard bicycle can be inserted into the connection hole 1402 and fixed to the screw hole 142 on the edge of the connection hole 1402 through the screw bolt 82, such that the inner wall of the connection hole 1402 is tightly positioned on the steerer tube 80. Thereby, the fixing base 14 can be secured onto the steerer tube 80. According to another embodiment that is not shown in the drawings, the longitudinal connection hole 1402 in the back of the fixing base 14 can be directly soldered and fixed onto the steerer tube 80, such that the fixing base 14 and the steerer tube 8 of the bicycle are joined to become one structure. The two handlebar grips 113 and the joints 111 are integrally formed. The two shafts 134 respectively pass through the holes 144, the bearing 121, and the two holes 146 of the fixing base 14. The positioning tenon 153 is accommodated into the mortise slot 147, and the stopper 148 is located in the recessive sliding groove 157. The upper fastener 141, the two handlebar grips 113, the slider 15, and the fixing base 14 can be joined to become one structure. When a force is exerted by a user's hand, the two handlebar grips 113 can be unfolded to the maximum degrees (i.e., 180 degrees, as shown in FIG. 1 and FIG. 3) with respect to the two shafts 134 as the rotational axes. As shown in FIG. 4B, the slider 150 protrudes from the recess 110, and the bottom of the press button 172 presses against the hinge surface 145. If a force is exerted by a user's finger to the slider 15, as shown by the arrow in FIG. 4B, the slider 15 is slidably fixed to the recess 110; at this time, the tenon 119 can be inserted into the mortise 152, and the slider 15 is positioned onto the two joints 111, as shown in FIG. 2, FIG. 3, and FIG. 5.

Figure 4A:
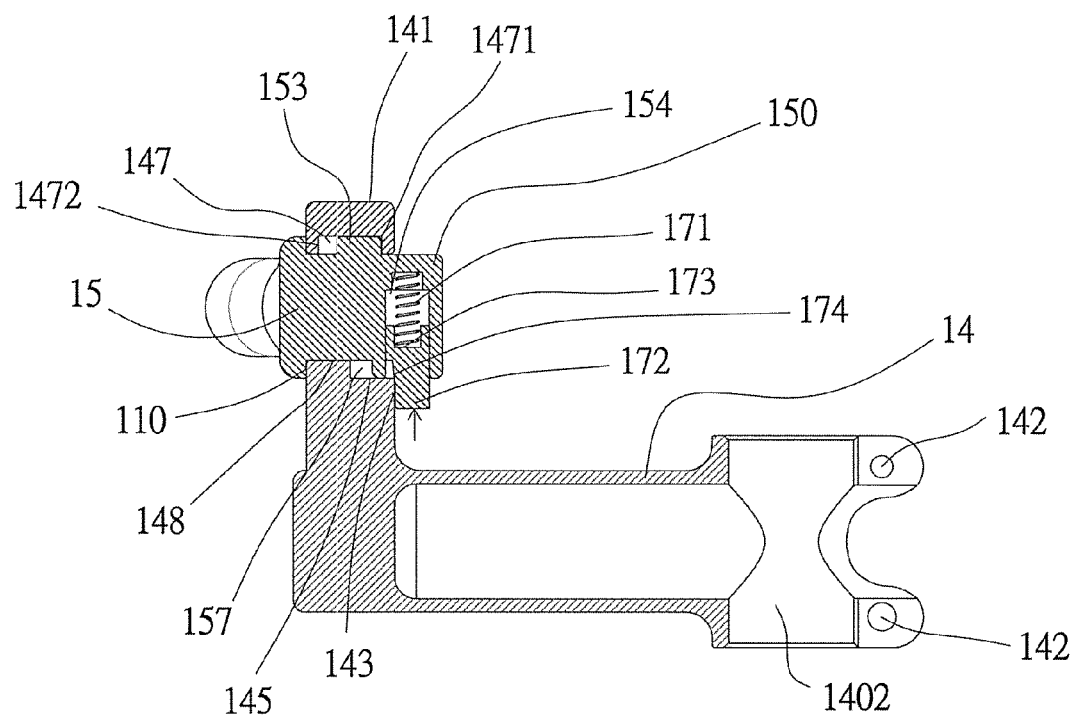
FIG. 4A is a longitudinal cross-sectional diagram taken along a section line A-A depicted in FIG. 3.
Figure 4B:
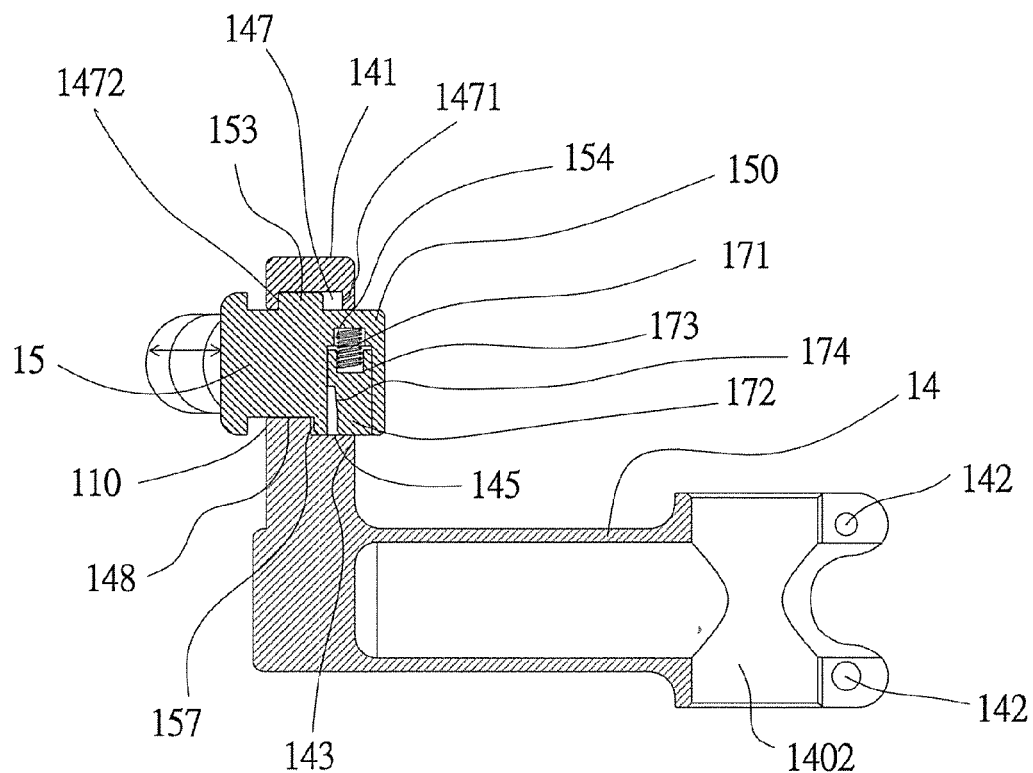
FIG. 4B is a schematic diagram illustrating the operational cross-section depicted in FIG. 4A.

As shown in FIG. 4B, a length of the mortise slot 147 is greater than a length of the positioning tenon 153; hence, if the slider 15 is to be slidably fixed to the recess 110, the positioning tenon 153 can relatively move forward in the mortise slot 147, and the sliding groove 157 simultaneously moves forward together with the protrusion 150, such that the stopper 148 is located at the rear side of the sliding groove 157 (as shown in FIG. 4A). When the protrusion 150 moves forward in the gap 10 to a front dead center, the press button 172 falls and is locked to the vertical wall 143 in the back of the fixing base 14; thereby, the slider 15 can act as a locking member that is locked and positioned to the two joints 111, and the two handlebar grips 113 are not loosened or disengaged even though the two handlebar grips 113 are unfolded to the maximum degrees (especially unfolded by a user's hand and used by the user). With reference to FIG. 4A, the inclined surface 174 of the press button 172 is positioned on the vertical wall 143 in the back of the fixing base 14. The inclined surface 174 prevents the press button 172 from falling off, and thereby the slider 15 may serve as a positioning device and does not move back and forth. In particular, the tenon 119 can be tightly inserted into the mortise 152, as shown in FIG. 2 and FIG. 5, and the two handlebar grips 113 unfolded to 180 degrees are not loosened or disengaged. If the two handlebar grips 113 are to be folded to minimize the folded volume of the bicycle, the user presses the press button 172 in an upward direction (as shown by the arrow respectively in FIG. 4A and FIG. 6A) with his or her finger (not shown), and the press button 172 is retracted into the room 154 (as shown in FIG. 4B). A force is then exerted by the finger to the protrusion 150 (as shown by the arrow in FIG.

6B), so that the protrusion 150 moves in the gap toward one side. With reference to FIG. 4B, the slider 150 leaves the recess 110, the bottom of the press button 172 presses against the hinge surface 145, and the positioning tenon 153 moves in the mortise slot 147 and is locked onto a back wall 1472 of the mortise slot 147. With reference to FIG. 2, the slider 15 leaves the recess 110, and the tenon 119 leaves the mortise 152 as well. At this time, the user holds the outer ends of the two handlebar grips 113 and pulls then inwardly with his or her hands, and the two joints 111 respectively rotate with respect to the two shafts 134 as the rotational axes, such that the two handlebar grips 113 are folded to the minimum volume, as shown in FIG. 6C. The slider 15 is in a protruding state, which represents the two handlebar grips 113 are not positioned yet. As shown by the arrow in FIG. 6D, the user exerts a force to the slider 15 with his or her finger, such that the slider 15 is positioned onto the two joints 111. In FIG. 4A and FIG. 5, similar to the above, the inclined surface 174 of the press button 172 is positioned on the vertical wall 143 in the back of the fixing base 14, the tenon 119 is tightly inserted into the mortise 152, the positioning tenon 153 is accommodated in the mortise slot 147 and pushes against a front wall 1471 of the mortise slot 147, and the recessive sliding groove 151 accommodates the stopper 148. The slider 15 described herein acts as the positioning device to position the two handlebar grips 113. At this time, the two handlebar grips 113 are folded to the minimum volume (as shown in FIG. 6D) and are locked and positioned.

Figure 5:
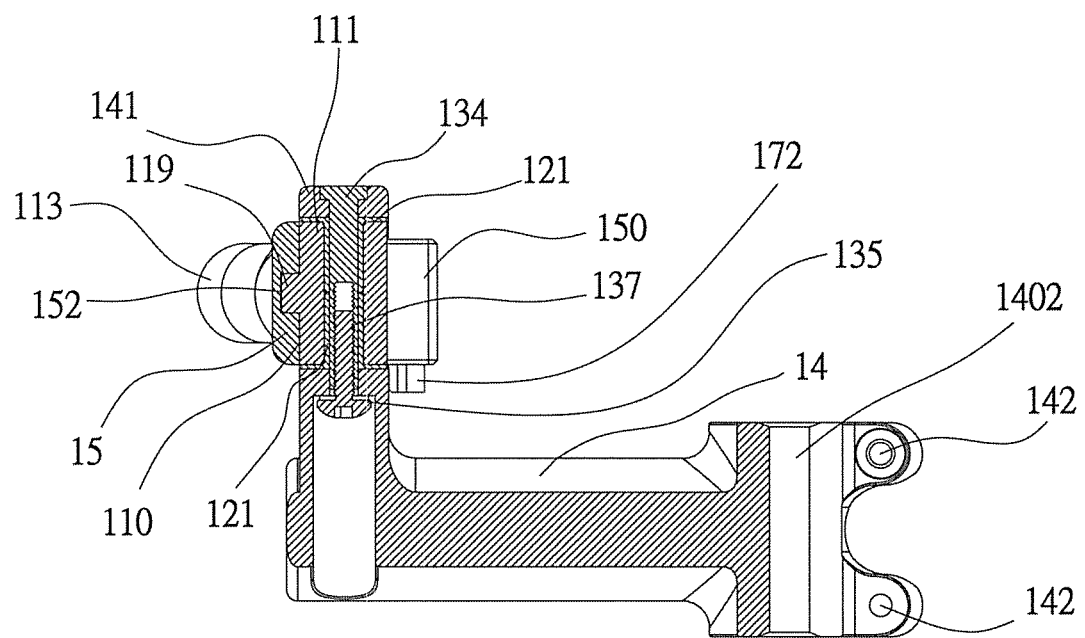
FIG. 5 is a longitudinal cross-sectional diagram taken along a section line B-B depicted in FIG. 3.
Figure 6A:
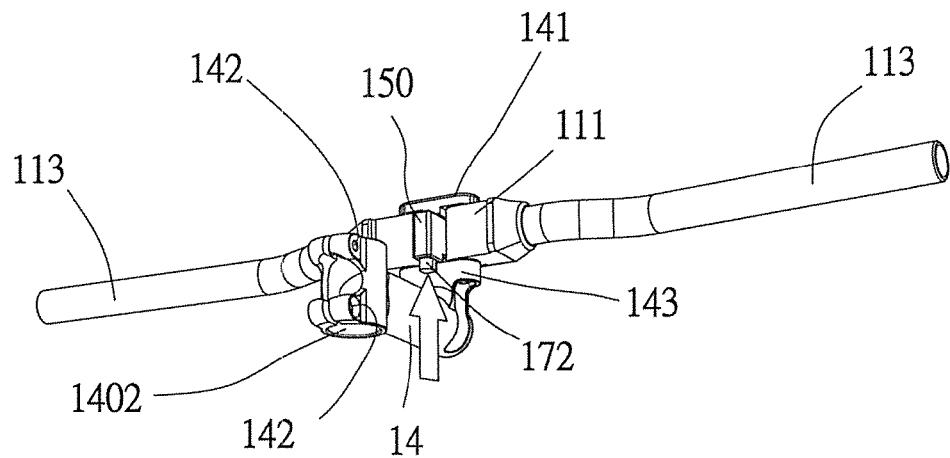
FIG. 6A is a three-dimensional diagram illustrating the operation of a foldable bicycle handlebar according to an embodiment of the invention.
Figure 6B:
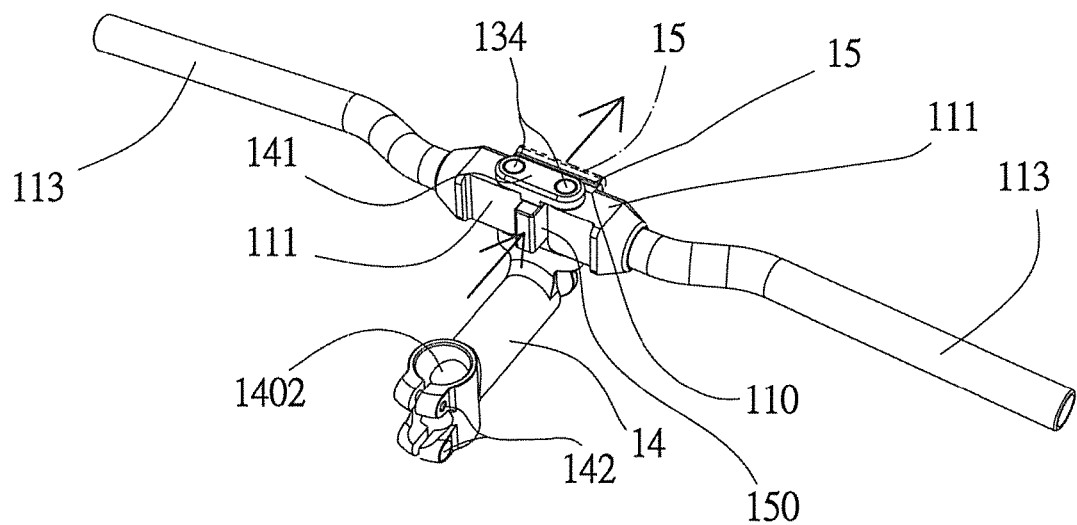
FIG. 6B is a three-dimensional diagram illustrating the operation of a foldable bicycle handlebar according to another embodiment of the invention.
Figure 6C:
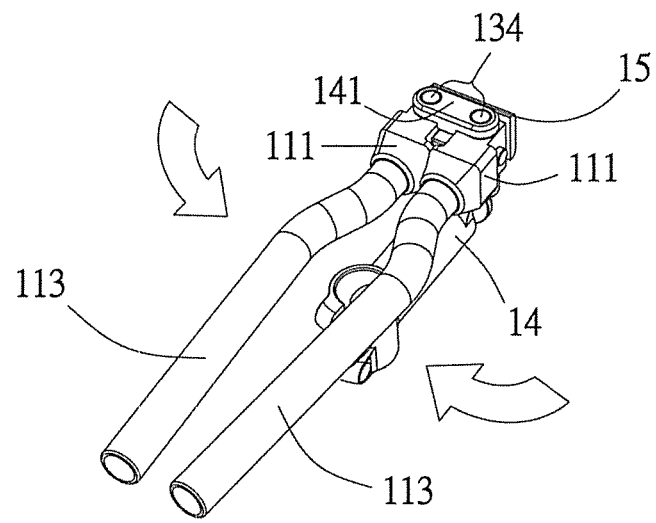
FIG. 6C is a three-dimensional diagram illustrating an action of folding two handlebar grips of a foldable bicycle handlebar according to an embodiment of the invention.
Figure 6D:
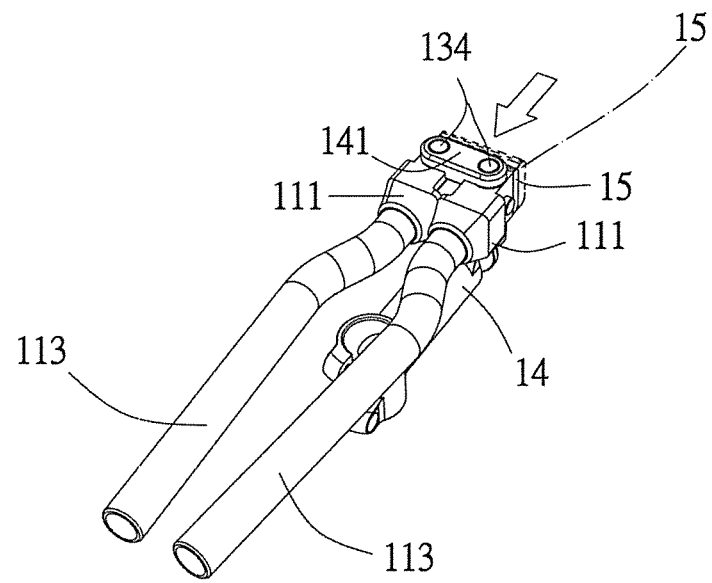
FIG. 6D is a three-dimensional diagram illustrating an action of folding and fixing two handlebar grips of a foldable bicycle handlebar according to another embodiment of the invention.

According to another embodiment, as shown in FIG. 2 and FIG. 5, the screw bolts 135 are screwed to the inner screw holes 137 of the two shafts 134, and the two shafts 134 preferably pass through the holes 144, the bearing 121, and the two holes 146 of the fixing base 14. The two shafts 134 described herein can be securely hinged to the hinge surface 145 of the fixing base 14 and to the joints 111; in addition, the bearing 121 is the oil-less bearing, and thus the central line around which the two shafts 134 rotate does not deviate. Here, corresponding sides of the two joints 111 are arc-shaped surfaces 120, so that no space is created if the two joints 111 are rotated and folded, and that the arc-shaped surfaces are prevented from pressing the two sides of the protrusion 150. In addition, the width of the gap 10 is greater than the width of the protrusion 150, and thus the protrusion 150 is able to move back and forth in the gap 10. Based on actual needs, the mortise 152 can be replaced by a tenon, and the corresponding tenon 118 can be replaced by a mortise; the male tenon and the female mortise are equivalent to those provided in the invention. In addition, the press button 172 may or may not be equipped with the inclined surface 174. As long as the press button 172 is able to be locked and positioned onto the vertical wall 143 in the back of the fixing base 14, no matter whether the press button 172 is equipped with the inclined surface 174, the press button falls within the scope of the invention and should not serve to limit the scope of the invention or its equivalents to the exemplary embodiments provided herein.

Figure 8:
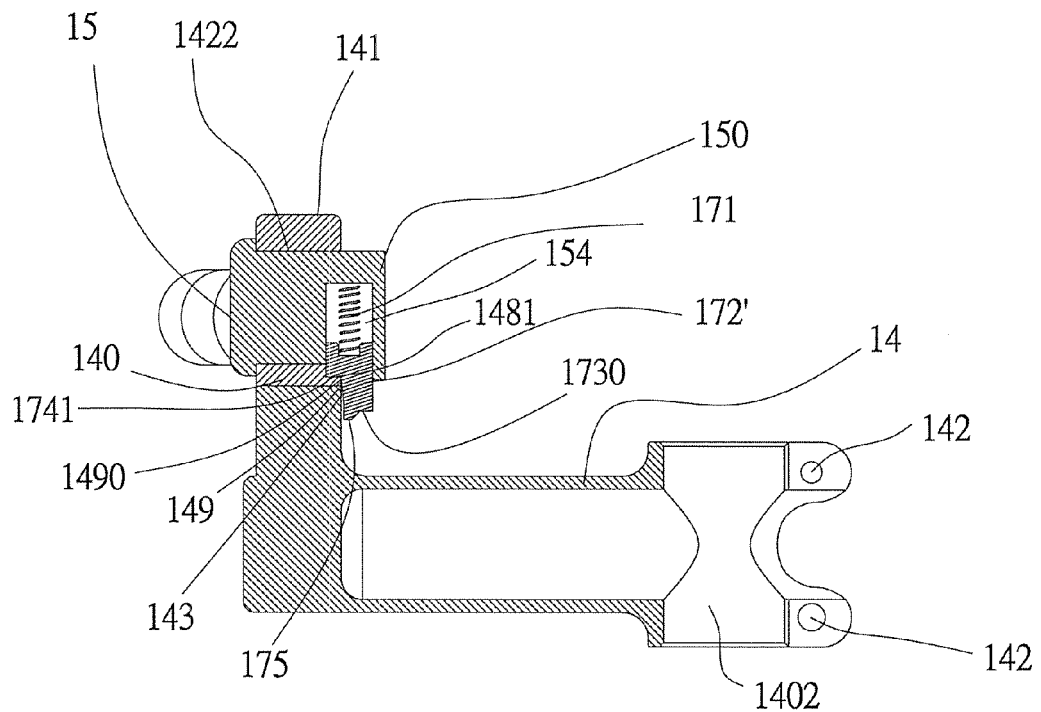
FIG. 8 is a cross-sectional diagram illustrating a foldable bicycle handlebar according to an embodiment of the invention.
Figure 9:
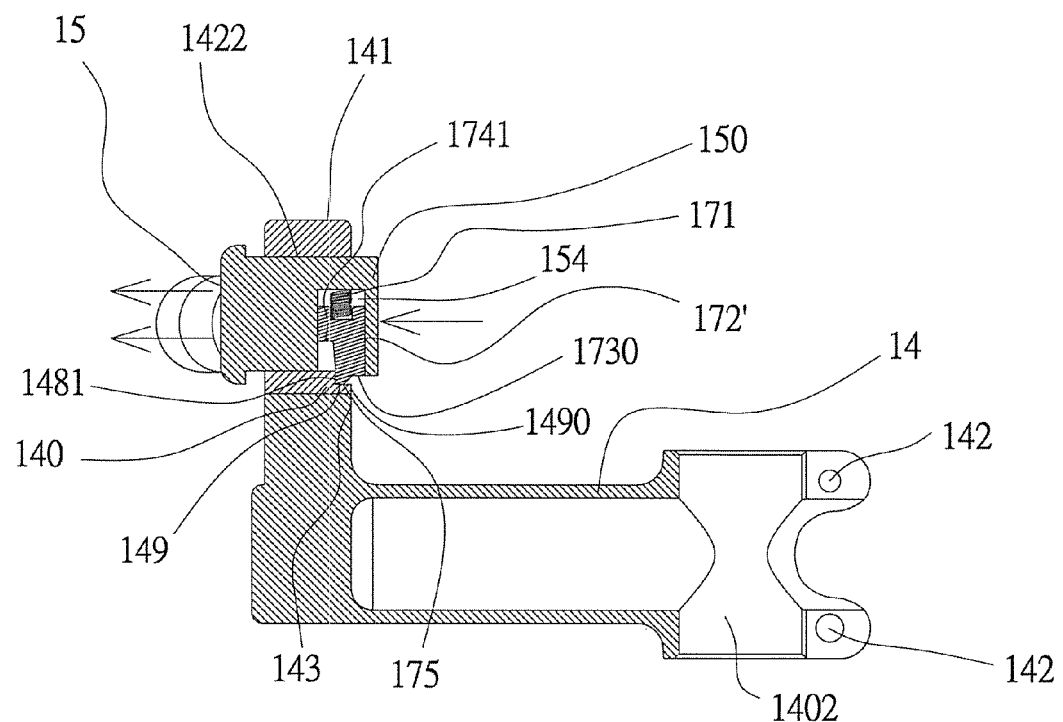
FIG. 9 is a schematic diagram illustrating the operational cross-section depicted in FIG. 8.

According to another embodiment, as shown in FIG. 7, FIG. 8, and FIG. 9, the press button 172' is shaped as a plate or a sheet and extended into the slot 1422 together with the protrusion 150. Thereby, when the inner surface 151 of the slider 15 is locked into the recess 110, the protrusion 150 is extended forward into the slot 1422, such that the press button 172' falls off and is positioned onto a lower edge 1490 of the bottom protrusion 140 and onto a vertical wall 143 in the back of the fixing base 14. The recessive locking portion 1741 is locked and positioned to the positioning portion 149, such that the press button 172' does not move back and forth. At this time, the tenon 119 is tightly inserted into the mortise 152, as shown in FIG. 5, and the slider 15 is tightly inserted into the recess 110, such that the two handlebar grips 113 unfolded to 180 degrees are not loosened or disengaged. As shown in FIG. 7 and FIG. 9, if the two handlebar grips 113 are to be folded, a user presses the press portion 1730 in an upward direction with his or her finger, and the press button 172' is then moved in an upward manner and leaves the vertical wall 143. A force is then exerted by the finger to the protrusion 150, such that the protrusion 150 in the slot 1422 transversely moves in a backward manner. The positioning tenon 175 is locked to the protruding stopper 1481, and thereby the protrusion 150 no longer moves. At this time, the tenon 119 is removed from the mortise 152, and the slider 15 is removed from the recess 110. The width of the bottom protrusion 140 is less than the width of the gap 10, and thus the user holds the two handlebar grips 113 and pulls then inwardly with his or her hands. As described above, the two joints 111 respectively rotate with respect to the two shafts 134 as the rotational axes, such that the two handlebar grips 113 are folded to the minimum volume. The user than presses the slider 15 with his or her finger, such that the slider 15 is tightly inserted into the recess 110. Similarly, the tenon 119 is tightly inserted into the mortise 152 as well, and the protrusion 150 is extended forward into the slot 1422. The press button 172' falls off and is positioned onto the vertical wall 143 in the back of the fixing base 14 and onto the lower edge 1490 of the bottom protrusion 140. Since the locking portion 1741 is locked and positioned to the positioning portion 149, the press button 172' does not move back and forth, and thus the two handlebar grips 113 are folded to the minimum volume and are neither loosened nor disengaged.

To sum up, no matter the two handlebar grips 113 are unfolded to the maximum degrees or folded to the minimum volume, the secure positioning device of the foldable bicycle handlebar described herein can ensure the safety of the two handlebar grips 113 in an operational state or in a storage state.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:
1. A foldable bicycle handlebar comprising:
a fixing base having two holes on a hinge surface in the front of the fixing base;
two handlebar grips, each of the two handlebar grips having a joint on its inner side, wherein the joints are rotatable if a force is exerted to the joints, a body of each of the joints has a longitudinal hinge hole, a recess is formed on a side surface of each of the two handlebar grips, and at least one tenon is formed on the recess;
an upper fastener fixed to the two joints, holes being formed on a body of the upper fastener;
two shafts respectively passing through the holes of the upper fastener, the hinge holes, and the two holes of the fixing base, the two handlebar grips being folded and unfolded at a limited angle with respect to the two shafts as rotational shifts, a gap being formed between the two joints; and
a slider having an inner surface, a protrusion being extended outwardly from the inner surface, a mortise being arranged on the inner surface, the at least one tenon being inserted into or removed from the mortise, the protrusion being extended into the gap, the slider being loosely or securely fixed to two joints, wherein a top distal end and a bottom distal end of the hinge hole of each of the joints are adapted to be respectively fixed to the upper fastener and a bearing, the body of the upper fastener has the holes, a mortise slot is formed on a bottom surface of the upper fastener, a positioning tenon is located on a top surface of the protrusion and is accommodated into the mortise slot, and the two shafts respectively pass through the holes of the upper fastener, the bearing, and the two holes of the fixing base.

2. A foldable bicycle handlebar comprising:

a fixing base having two holes on a hinge surface in the front of the fixing base;

two handlebar grips, each of the two handlebar grips having a joint on its inner side, wherein the joints are rotatable if a force is exerted to the joints, a body of each of the joints has a longitudinal hinge hole, a recess is formed on a side surface of each of the two handlebar grips, and at least one tenon is formed on the recess;

an upper fastener fixed to the two joints, holes being formed on a body of the upper fastener;

two shafts respectively passing through the holes of the upper fastener, the hinge holes, and the two holes of the fixing base, the two handlebar grips being folded and unfolded at a limited angle with respect to the two shafts as rotational shifts, a gap being formed between the two joints; and a slider having an inner surface, a protrusion being extended outwardly from the inner surface, a mortise being arranged on the inner surface, the at least one tenon being inserted into or removed from the mortise, the protrusion being extended into the gap, the slider being loosely or securely fixed to two joints, wherein the protrusion of the slider has a room for accommodating an elastic member and a press button, an inclined surface is formed on one side of the press button, a connection portion is located on top of the press button, the connection portion accommodates and presses against the elastic member, a recessive sliding groove is located at a bottom of the protrusion, a stopper is located on the hinge surface in the front of the fixing base, and the stopper is located in the sliding groove.

3. A foldable bicycle handlebar comprising:

a fixing base having two holes on a hinge surface in the front of the fixing base;

two handlebar grips, each of the two handlebar grips having a joint on its inner side, wherein the joints are rotatable if a force is exerted to the joints, a body of each of the joints has a longitudinal hinge hole, a recess is formed on a side surface of each of the two handlebar grips, and at least one tenon is formed on the recess;

an upper fastener fixed to the two joints, holes being formed on a body of the upper fastener;

two shafts respectively passing through the holes of the upper fastener, the hinge holes, and the two holes of the fixing base, the two handlebar grips being folded and unfolded at a limited angle with respect to the two shafts as rotational shifts, a gap being formed between the two joints; and a slider having an inner surface, a protrusion being extended outwardly from the inner surface, a mortise being arranged on the inner surface, the at least one tenon being inserted into or removed from the mortise, the protrusion being extended into the gap, the slider being loosely or securely fixed to two joints, wherein the protrusion of the slider has a room located at a bottom portion of the slider, the room accommodates an elastic member and a press button, the press button forms an elastic device, a recessive locking portion is formed on one side of the press button, a positioning tenon is formed at a bottom portion of the press button, and a press portion ready to be pressed by a user's finger is formed at a rear portion of the positioning tenon, wherein a hollow bottom protrusion is formed on a bottom portion of the upper fastener, the hollow bottom protrusion and the upper fastener are integrally formed, the hollow bottom protrusion has a slot, a protruding stopper is formed on a bottom surface of the slot, the protrusion passes through the slot, the positioning tenon is lockable to the protruding stopper, and the press button is capable of being pushed out and positioned on an edge of the hollow bottom protrusion and on a vertical wall in the back of the fixing base.

4. The foldable bicycle handlebar according to claim 1, wherein the protrusion of the slider has a room located at a bottom portion of the slider, the room accommodates an elastic member and a press button, the press button forms an elastic device, a recessive locking portion is formed on one side of the press button, a positioning tenon is formed at a bottom portion of the press button, and a press portion ready to be pressed by a user's finger is formed at a rear portion of the positioning tenon, wherein a hollow bottom protrusion is formed on a bottom portion of the upper fastener, the hollow bottom protrusion and the upper fastener are integrally formed, the hollow bottom protrusion has a slot, a protruding stopper is formed on a bottom surface of the slot, the protrusion passes through the slot, the positioning tenon is lockable to the protruding stopper, and the press button is capable of being pushed out and positioned on an edge of the hollow bottom protrusion and on a vertical wall in the back of the fixing base.

* * * * *